US012444284B2

(12) United States Patent
Schmidt

(10) Patent No.: US 12,444,284 B2
(45) Date of Patent: Oct. 14, 2025

(54) INTRUDER DETERRENT SYSTEM

(71) Applicant: Robert Schmidt, West Valley City, UT (US)

(72) Inventor: Robert Schmidt, West Valley City, UT (US)

( * ) Notice: Subject to any disclaimer, the term of this patent is extended or adjusted under 35 U.S.C. 154(b) by 0 days.

(21) Appl. No.: 17/871,016

(22) Filed: Jul. 22, 2022

(65) Prior Publication Data

US 2023/0023790 A1 Jan. 26, 2023

Related U.S. Application Data

(60) Provisional application No. 63/225,181, filed on Jul. 23, 2021.

(51) Int. Cl.
*G08B 15/00* (2006.01)
*G08B 13/196* (2006.01)

(52) U.S. Cl.
CPC ........... *G08B 15/00* (2013.01); *G08B 13/196* (2013.01)

(58) Field of Classification Search
CPC .............. G08B 15/00; G08B 13/19608; G08B 13/19695; G01P 13/00; G03B 15/03; H04N 7/186
See application file for complete search history.

(56) References Cited

U.S. PATENT DOCUMENTS

2005/0219042 A1* 10/2005 Thomson ............ B60R 25/1004 340/666
2018/0158305 A1* 6/2018 Noland .............. G08B 21/0438
2020/0090480 A1* 3/2020 Sacre ....................... G01P 13/00
2021/0037341 A1* 2/2021 Joao ........................ G01S 19/13
2022/0189223 A1* 6/2022 Carter ..................... H04N 7/186
2022/0270421 A1* 8/2022 Carter ..................... B64U 80/25
2023/0243625 A1* 8/2023 Adrain ............. G08B 13/19656 89/36.02

* cited by examiner

*Primary Examiner* — Mirza F Alam
(74) *Attorney, Agent, or Firm* — Brennan, Manna & Diamond, LLC

(57) ABSTRACT

The present invention relates to an intruder deterrent system. The system is comprised of a deterrent device is further comprised of a camera, a speaker, and a light. An area can be monitored by a user using the camera such that a user can deter an intruder by producing a loud sound from the speaker and by causing the light to strobe.

8 Claims, 5 Drawing Sheets

INTRODER DETERRENT SYSTEM

CROSS-REFERENCE TO RELATED APPLICATION

The present application claims priority to, and the benefit of, U.S. Provisional Application No. 63/225,181, which was filed on Jul. 23, 2021, and is incorporated herein by reference in its entirety.

FIELD OF THE INVENTION

The present invention relates generally to the field of security devices. More specifically, the present invention relates to an intruder deterrent system. The system is comprised of a deterrent device further comprised of a camera, a speaker, and a light. An area can be monitored by a user using the camera such that a user can deter an intruder by producing a loud sound from the speaker and by causing the light to strobe. Accordingly, the present disclosure makes specific reference thereto. Nonetheless, it is to be appreciated that aspects of the present invention are also equally applicable to other like applications, devices, and methods of manufacture.

BACKGROUND

Unauthorized entry into a home, office, school, garage, etc., can occur without an owner or custodian being aware. Dangerous situations can develop if intruders attempt to steal items or cause damage to said areas. To prevent intruders, many areas use security cameras. However, camera systems only record intruders and lack the means to deter the intruder from entering.

Therefore, there exists a long-felt need in the art for an improved security system. There also exists a long-felt need in the art for an intruder deterrent system that can monitor and identify intruders. Further, there exists a long-felt need in the art for an intruder deterrent system that can deter intruders. In addition, there exists a long-felt need in the art for an intruder deterrent system that does not require the action of the system owner to deter intruders.

The subject matter disclosed and claimed herein, in one embodiment thereof, comprises an intruder deterrent system. The system is primarily comprised of at least one deterrent device and at least one method of use of a monitoring system. The deterrent device is comprised of a camera, a speaker, and a light. An area can be monitored by a user using the camera such that the user can deter an intruder by producing a loud sound from the speaker and by causing the light to strobe. The device can further be mounted in a plurality of areas using a mount.

In this manner, the intruder deterrent system of the present invention accomplishes all of the foregoing objectives and provides an intruder deterrent system. The system can monitor, identify, and deter intruders. While doing so, the system does not require the action of the system owner to deter intruders and instead can be operated by a trained user.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises an intruder deterrent system. The system is primarily comprised of at least one deterrent device and at least one monitoring system. The deterrent device is comprised of at least one enclosure that may resemble a floor cabinet, a wall cabinet, or a mobile mast cabinet. The walls of the enclosure are preferably made from a bullet-resistant material and may further be supported by at least one external or internal frame made from a durable metal such as, but not limited to, stainless steel or aluminum. The enclosure may be covered by at least one slipcover that has any number of patterns, logos, emblems, images, symbols, designs, letters, numbers, words, characters, animals, advertisements, brands, etc., to conceal the device from view when positioned in an interior or exterior space.

The interior space of the enclosure houses a plurality of electronic components such as, but not limited to, at least one battery, at least one charging system for the battery, and a plurality of electronics. The electronics may include, but are not limited to, at least one Wi-Fi router, at least one Cat 6 Port (or other electronic connection port), at least one cradle point modem, at least one intrusion soundboard, at least one computer, at least one modem, and at least one antenna. The interior space may also house at least one audio amplifier and at least one speaker. The speaker preferably produces 156 decibels of sound that may be bore-sighted or directional sound. The interior space may also include at least one light and at least one camera that can pan, zoom, and/or tilt. The light is preferably, but is not limited to, a strobe light and the camera may be any camera type known in the art such as, but not limited to, HD, night vision, infrared, thermal, etc.

The outer surface of at least one wall may further be comprised of at least one speaker, at least one sensor, and at least one light in the form of a high-intensity light or any other light type known in the art. The sensor may be a plurality of sensor types such as, but not limited to, a radar sensor, an artificial intelligence sensor, a driven motion sensor, a sound sensor, a vibration sensor, a detection sensor, a silent alarm sensor, etc.

The deterrent device can be mounted to a wall via at least one mount which may be a stationary mount, a motorized, panning/articulating mount, or a pole mount. The mount preferably houses at least one light such as, but not limited to, an 18,000-36,000 lumen LED light, at least one camera such as, but not limited to, an undermount auto dome PTZ camera, at least one speaker such as, but not limited to, a long-distance hailing speaker, and a plurality of electronics such as, but not limited to, at least one computer, at least one modem, at least one antenna, at least one intrusion control board, at least one wireless transmitter (ex. Bluetooth), at least one remote external motion sensor, and/or at least one ground-type sensor.

The system is further comprised of a monitoring system that can be used in a method of use. The monitoring system is operated by a trained user that can monitor an area surrounding the device using the camera and the sensor to identify, record, track, and target individuals within said area such as, but not limited to, intruders, trespassers, criminals, unwanted persons, active shooters, robbers, etc. The user may be alerted to said targeted individuals via monitoring the camera or an alert notification from the sensor that is sent to a central monitoring center that can be viewed by all trained users. Once alerted, the user can then use the speaker and light of the device to distract the targeted individual using the device via a series of verbal commands delivered via the speaker, pulsating/strobing lights, and frequencies up to 156 decibels delivered from the speaker.

Accordingly, the intruder deterrent system of the present invention is particularly advantageous as it provides an intruder deterrent system that can monitor, identify, and deter intruders. While doing so, the system that does not require the action of the system owner to deter intruders and instead relies on a trained user. In this manner, the intruder deterrent system overcomes the limitations of existing security cameras known in the art.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION

Figure 1:
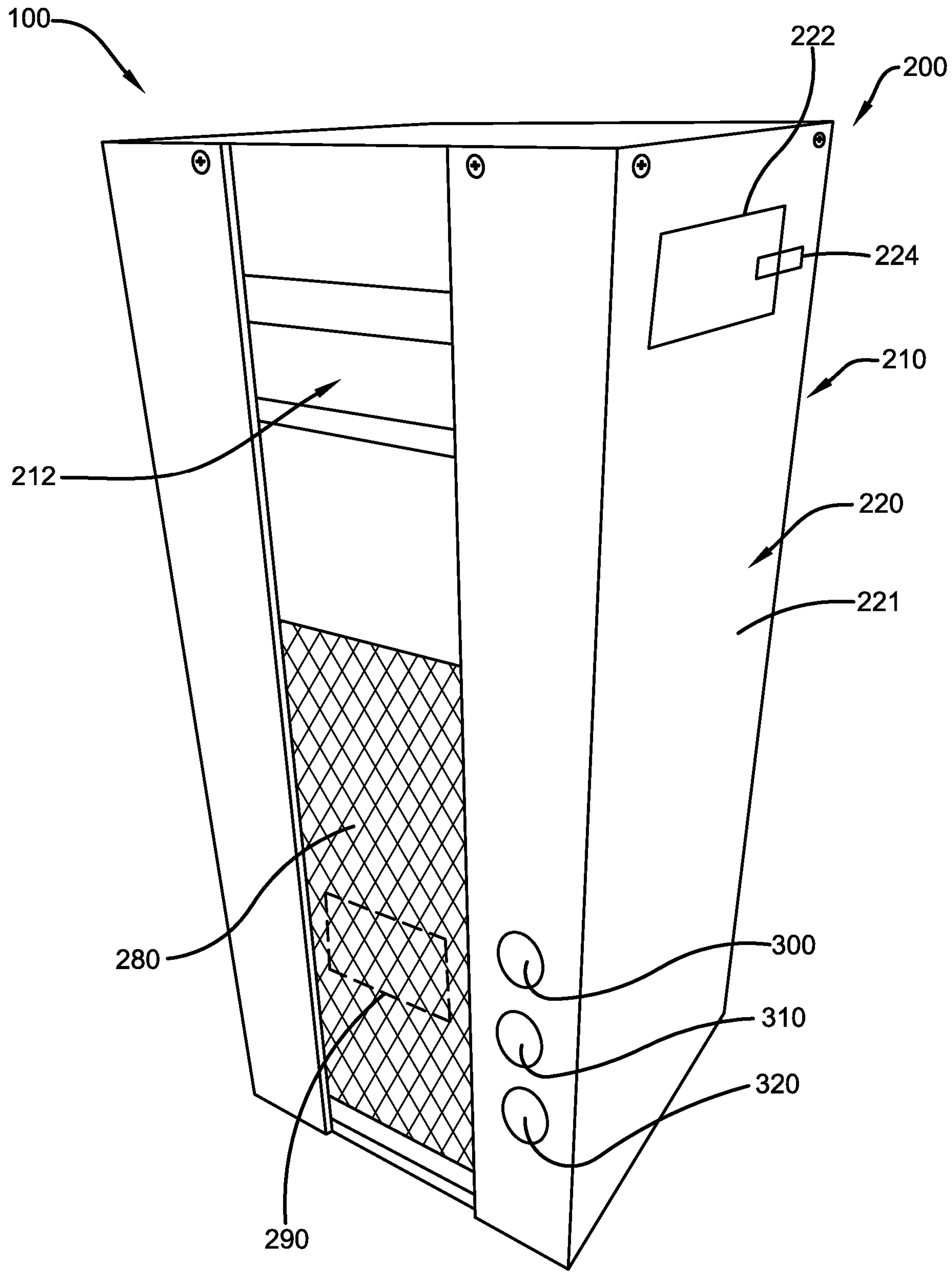
FIG. 1 illustrates a perspective view of one potential embodiment of a deterrent device of an intruder deterrent system of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long-felt need in the art for an improved security system. There also exists a long-felt need in the art for an intruder deterrent system that can monitor and identify intruders. Further, there exists a long-felt need in the art for an intruder deterrent system that can deter intruders. In addition, there exists a long-felt need in the art for an intruder deterrent system that does not require the action of the system owner to deter intruders.

The present invention, in one exemplary embodiment, is comprised of an intruder deterrent system primarily comprised of at least one deterrent device and at least one monitoring system. The deterrent device is comprised of at least one enclosure that may resemble a floor cabinet, a wall cabinet, or a mobile mast cabinet, and wherein the walls of the enclosure are preferably made from a bullet-resistant material and may further be supported by at least one external or internal frame made from a durable metal such as, but not limited to, stainless steel or aluminum. The enclosure may be covered by at least one slipcover that has any number of patterns, logos, emblems, images, symbols, designs, letters, numbers, words, characters, animals, advertisements, brands, etc., to conceal the device from view when positioned in an interior or exterior space.

The interior space of the enclosure houses a plurality of electronic components such as, but not limited to, at least one battery, at least one charging system for the battery, and a plurality of electronics. The electronics may include, but are not limited to, at least one Wi-Fi router, at least one Cat 6 Port (or other electronic connection port), at least one cradle point modem, at least one intrusion soundboard, at least one computer, at least one modem, and at least one antenna. The interior space may also house at least one audio amplifier and at least one speaker that preferably produces 156 decibels of sound that may be bore-sighted or directional sound. The interior space may also include at least one light and at least one camera that can pan, zoom, and/or tilt. The light is preferably, but is not limited to, a strobe light and the camera may be any camera type known in the art such as, but not limited to, HD, night vision, infrared, thermal, etc.

The outer surface of at least one wall may further be comprised of at least one speaker, at least one sensor, and at least one light in the form of a high-intensity light or any other light type known in the art. The sensor may be a plurality of sensor types such as, but not limited to, a radar sensor, an artificial intelligence sensor, a driven motion sensor, a sound sensor, a vibration sensor, a detection sensor, a silent alarm sensor, etc.

The deterrent device can be mounted to a wall via at least one mount. The mount may be a stationary mount, a motorized, panning/articulating mount, or a pole mount. The mount preferably houses at least one light such as, but not limited to, an 18,000-36,000 lumen LED light, at least one camera such as, but not limited to, an undermount auto dome PTZ camera, at least one speaker such as, but not limited to, a long-distance hailing speaker, and a plurality of electronics such as, but not limited to, at least one computer, at least one modem, at least one antenna, at least one intrusion control board, at least one wireless transmitter (i.e., Bluetooth), at least one remote external motion sensor, and/or at least one ground-type sensor.

The system is also comprised of a monitoring system that can be used in a method of use, wherein the monitoring system is operated by a trained user that can monitor an area surrounding the device using the camera and sensor to identify, record, track, and target individuals within said area such as, but not limited to, intruders, trespassers, criminals, unwanted persons, active shooters, robbers, etc. The user may be alerted to said targeted individuals via monitoring the camera or an alert notification from the sensor that is sent to a central monitoring center that can be viewed by all trained users. Once alerted, the user can then use the speaker and light of the device to distract the targeted individual using the device via a series of verbal commands delivered via the speaker, pulsating lights, and frequencies up to 156 decibels delivered from the speaker.

Accordingly, the intruder deterrent system of the present invention is particularly advantageous as it provides an intruder deterrent system can monitor, identify, and deter intruders. While doing so, the system that does not require the action of the system owner to deter intruders. In this manner, the intruder deterrent system overcomes the limitations of existing security cameras known in the art.

Referring initially to the drawings, FIG. 1 illustrates a perspective view of one potential embodiment of a deterrent device 200 of an intruder deterrent system 100 of the present invention in accordance with the disclosed architecture. The system 100 is primarily comprised of at least one deterrent device 200 and at least one monitoring system 400. The deterrent device 200 is comprised of at least one enclosure 210 that houses a plurality of components. In the preferred embodiment, the enclosure 210 is rectangular in shape and has a plurality of walls 220. However, in differing embodiments the enclosure 210 may be any shape known in the art such as, but not limited to, square, triangular, circular, etc. The enclosure 210 may resemble a floor cabinet, a wall cabinet, or a mobile mast cabinet. The walls 220 are preferably made from a bullet-resistant material such as, but not limited to, armor steel, ceramic, polyethylene, or any other bullet-resistant or bulletproof material known in the art. In one embodiment, each wall 220 has a plurality of layers of said material that together form each wall 220. The enclosure 210 may further be supported by at least one external or internal frame 260 that is preferably welded (in one embodiment, to the enclosure 210) and made from a durable metal such as, but not limited to, stainless steel or aluminum.

Figure 2:
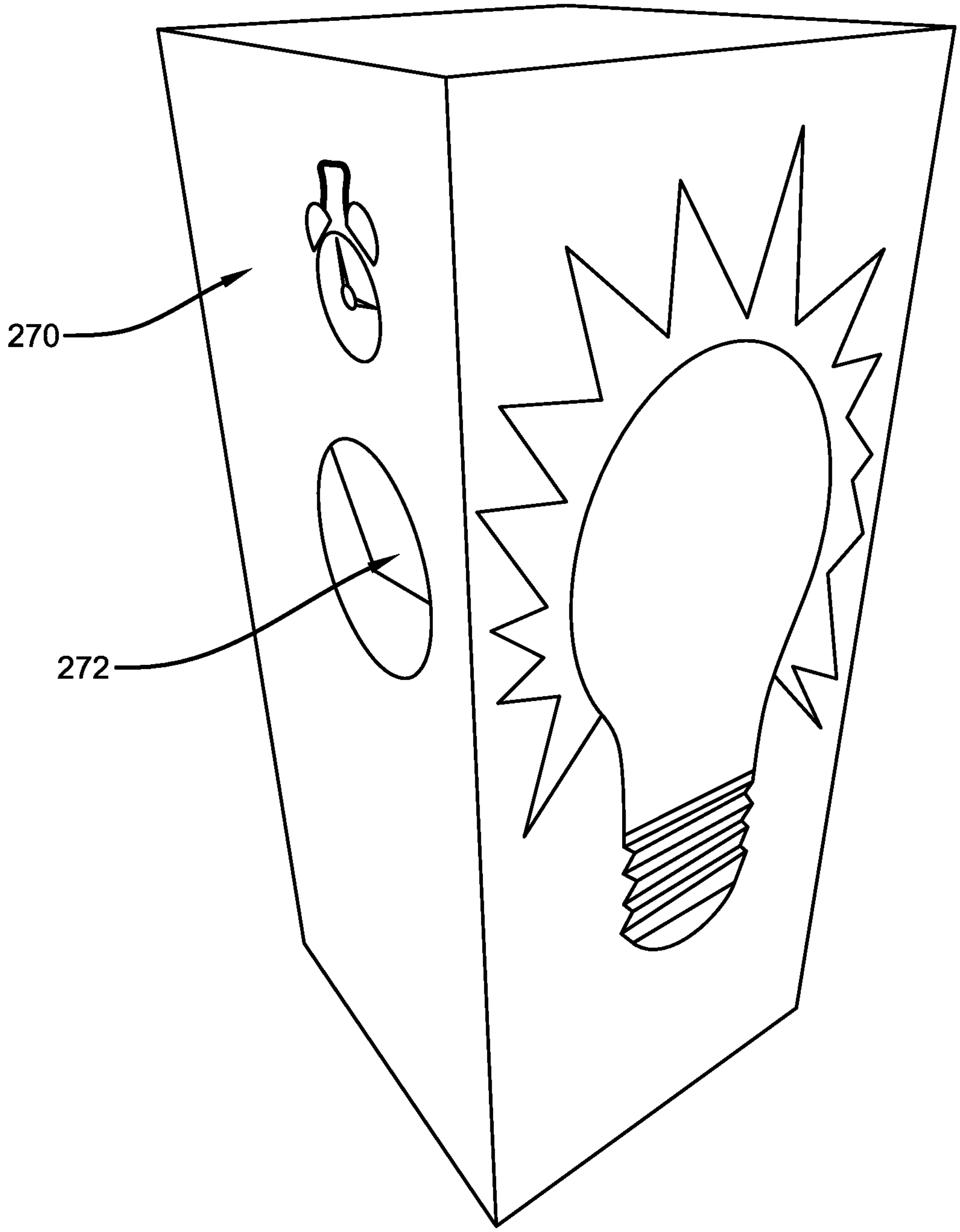
FIG. 2 illustrates a perspective view of one potential embodiment of a deterrent device with a slipcover of an intruder deterrent system of the present invention in accordance with the disclosed architecture.

The enclosure 210 may be covered by at least one slipcover 270, as seen in FIG. 2. The cover 270 is preferably made from a fabric material such as, but not limited to, vinyl, canvas, cashmere, chenille, chiffon, cotton, damask, jersey, lace, linen, wool, modal, polyester, satin, silk, spandex, suede, tweed, twill, velvet, acrylic, modacrylic, nylon, polypropylene, polyurethane, polyvinyl chloride, polyethylene, vinylidene, benzoate, aramid, rayon, acetate, triacetate, etc. The cover 270 may further have at least one indicia 272 such as, but not limited to, patterns, logos, emblems, images, symbols, designs, letters, numbers, words, characters, animals, advertisements, brands, etc., to conceal the device 200 from view when positioned in an interior or exterior space.

Figure 3:
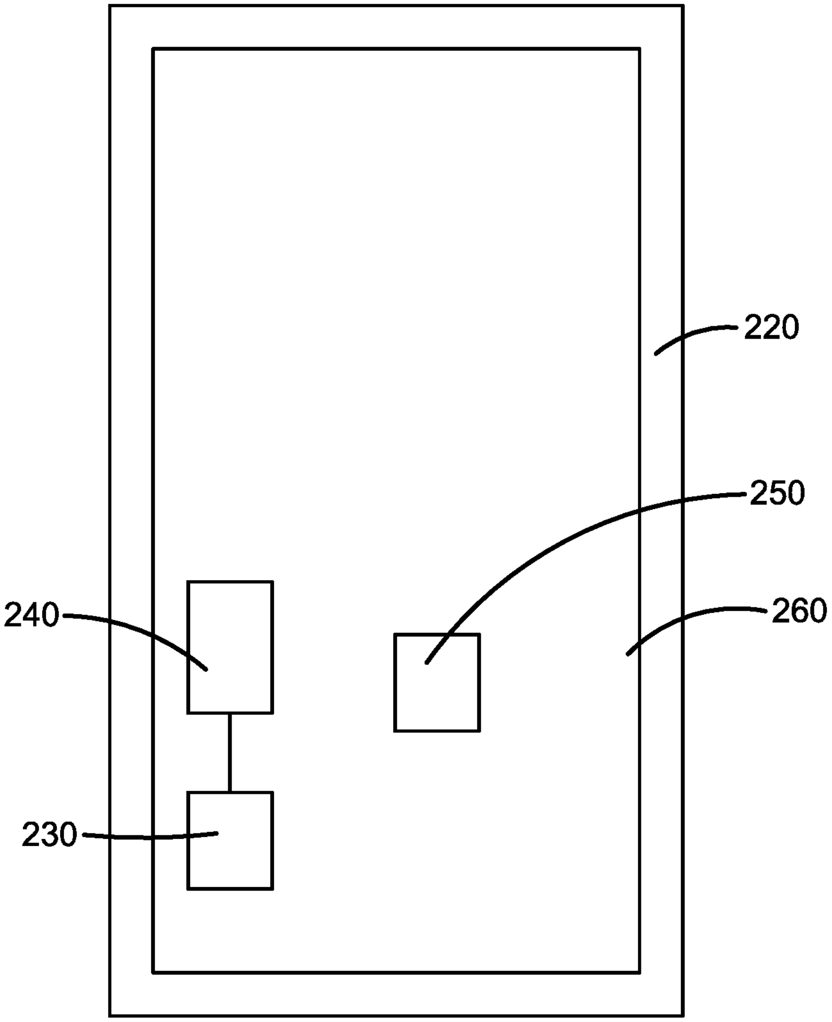
FIG. 3 illustrates a side cross-sectional view of one potential embodiment of a deterrent device with a slipcover of an intruder deterrent system of the present invention in accordance with the disclosed architecture.

At least one wall 220 is further comprised of at least one access panel 222 that allows a user to access the interior space 212 of the enclosure 210 which houses a plurality of electronic components 250. The panel 222 may be secured via at least one lock 224 such as, but not limited to, a padlock, a deadbolt lock, a cam lock, a rim/mortise lock, a euro profile cylinder lock, an interchangeable core cylinder lock, a furniture latch lock, a rim latch lock, a biometric fingerprint scanning lock, an RFID key fob lock, a Bluetooth lock that unlocks via a smart device mobile application, a mechanical dial lock, a numerical combination lock, a pedestal lock, a draw lock, a fixed core lock, etc. Said components 250 include, but are not limited to, at least one battery 230, at least one charging system 240 for the battery 230, and a plurality of electronics, as seen in FIG. 3. The battery 230 is preferably, but is not limited to, a 12V DC battery. The charging system 240 is preferably, but not limited to, a 110 AC trickle charging system. In one embodiment, there may be two batteries 230, wherein one battery 230 is a backup battery that is hardwired to an existing power source. The electronics 250 may include, but is not limited to, at least one Wi-Fi router, at least one Cat 6 Port (or other electronic connection port), at least one cradle point modem, at least one intrusion soundboard, at least one computer, at least one modem, and at least one antenna. The interior space 212 may also house at least one audio amplifier 290 and at least one speaker 280, wherein the sound from the speaker 280 can be amplified by the amplifier 290. In various embodiments, the speaker 280 may be any speaker type known in the art but is preferably a TCP-A10 long-distance hailing speaker or a standard audio voice speaker. The speaker 280 preferably produces 156 decibels (or less) of sound that may be bore-sighted or directional sound. However, in differing embodiments the speaker 280 may produce at least 120 decibels, at least 140 decibels, or any other decibel amount of sound. In one embodiment, the speaker 280 is a train horn that can produce decibel sounds up to 300 decibels. The speaker 280 may produce a plurality of frequencies at once. The speaker 280 may produce voice commands or live audio to present the illusion of a person or multiple persons physically present.

The interior space 212 may also include at least one light 300 and at least one camera 310 that can pan, zoom, and/or tilt. The light 300 is preferably, but is not limited to, a strobe light and the camera 310 may any camera type known in the art such as, but not limited to, HD, night vision, infrared, thermal, etc.

The outer surface 221 of at least one wall 220 may further be comprised of at least one speaker 280, at least one sensor 320, and at least one light 300 in the form of a high-intensity light or any other light type known in the art. The sensor 320 may be a plurality of sensor types such as, but not limited to, a radar sensor, an artificial intelligence sensor, a driven motion sensor, a sound sensor, a vibration sensor, a detection sensor, a silent alarm sensor, etc. In an embodiment with a sound sensor 320, the sensor 320 may activated if a decibel level is exceeded. In one embodiment, the decibel level is at least 140 decibels. This allows the sensor 320 to be activated in the event of a gunshot. Activation of the sensor 320 may automatically activate the speaker 280, 336 and/or light 300, 332.

Figure 4:
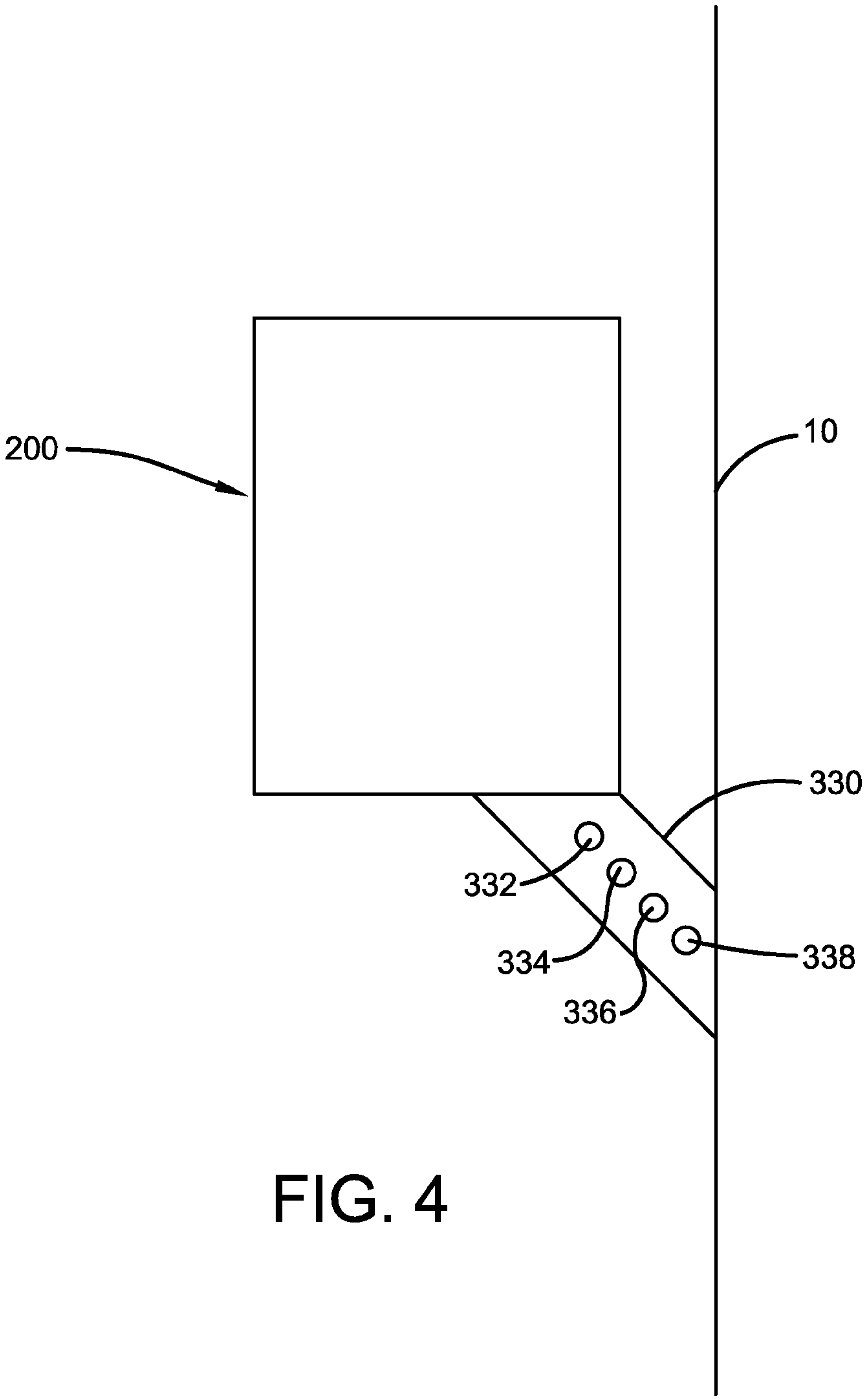
FIG. 4 illustrates a side view of one potential embodiment of a deterrent device and a mount of an intruder deterrent system of the present invention in accordance with the disclosed architecture.

FIG. 4 illustrates a side view of one potential embodiment of a deterrent device 200 and a mount 330 of an intruder deterrent system 100 of the present invention in accordance with the disclosed architecture. The deterrent device 200 can be mounted to a wall 10 via at least one mount 330. The mount 330 may be a stationary mount or a motorized, panning/articulating mount. The mount 330 may alternatively, be a pole mount. The mount 330 is preferably made from steel, aluminum, or carbon fiber type material and may be of various shapes and sizes for interior/exterior installations and uses. The wall mount 330 preferably houses at least one light 332 such as, but not limited to, an 18,000-36,000 lumen LED light, at least one camera 334 such as, but not limited to, under-mount auto dome PTZ camera, at least one speaker 336 such as, but not limited to, a long-distance hailing speaker, and a plurality of electronic components 338 such as, but not limited to, at least one computer, at least one modem, at least one antenna, at least one intrusion control board, at least one wireless transmitter (i.e., Bluetooth), at least one remote external motion sensor, and/or at least one ground-type sensor. It should be appreciated that all components of the enclosure 210 may be found on the mount 330.

In one embodiment, multiple deterrent devices 200 (or a plurality of speakers 280, 336 from one deterrent device 200 that are positioned at various areas outside of the enclosure 210) can be used to give the illusion of multiple individuals or first responders at multiple locations (e.g. to the front, rear, sides, etc. of the intruder) to disorient the intruder.

Figure 5:
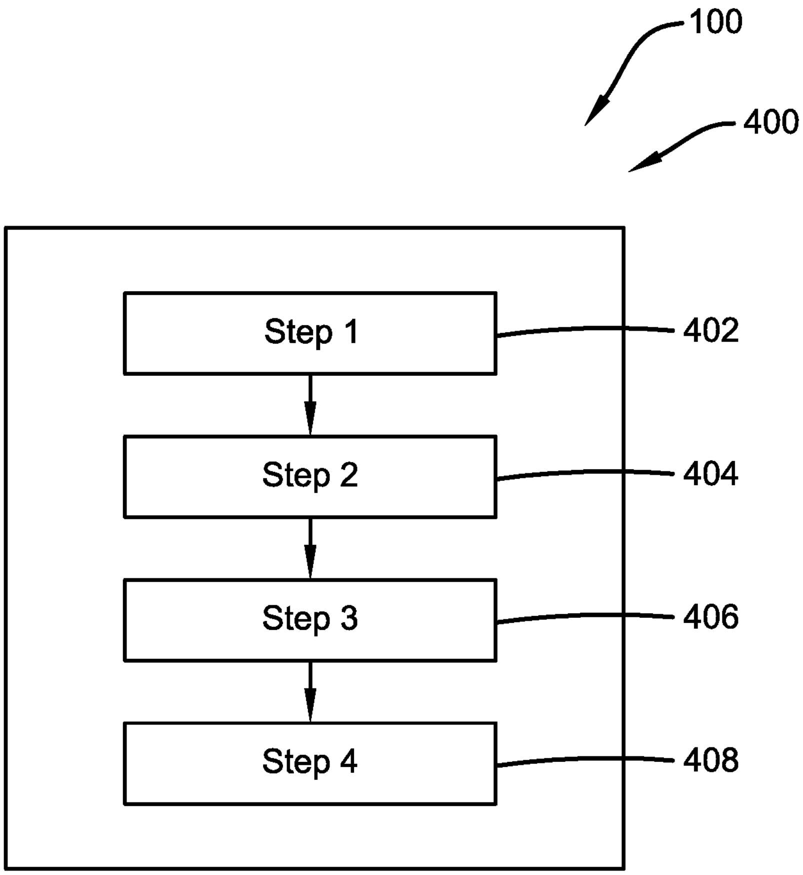
FIG. 5 illustrates a flow chart of one potential method of using an embodiment of an intruder deterrent system of the present invention in accordance with the disclosed architecture.

FIG. 5 illustrates a flow chart of one potential method 400 of using an embodiment of an intruder deterrent system 100 of the present invention in accordance with the disclosed architecture. The system 100 is further comprised of a monitoring system that can be used in a method of use 400. The monitoring system is operated by a trained user. The user can monitor an area surrounding the device 200 using the camera 310 and sensor 320 to identify, record, track, and target individuals within said area such as, but not limited to, intruders, trespassers, criminals, unwanted persons, active shooters, robbers, etc. [Step 402]. The user may be alerted to said targeted individuals via monitoring the camera 310 or an alert notification 410 from the sensor 320 that is sent to a central monitoring center 420 that can be viewed by all trained users [Step 404]. The user can then use the speaker 280 and light 300 of the device 200 to distract the targeted individual using the device 200 [Step 406]. This can be done via a series of verbal commands delivered via the speaker 280, pulsating/strobing lights 300, and frequencies up to 156 decibels delivered from the speaker 280. The user can also communicate with first responders 440 such as police, fire, and medical to alert said persons of the presence of the targeted individual at the specific location using a photo or video of said person from the camera 310 [Step 408].

It should be appreciated that in various embodiments all or some components of the device 200 may be housed within the interior space 212 or on the outer surface 221 of at least one wall 220. All electric components 250 preferably have multiple layers of operating system protection to maintain operability if an individual attempts to disable said component 250.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "intruder deterrent system" and "system" are interchangeable and refer to the intruder deterrent system 100 of the present invention.

Notwithstanding the foregoing, the intruder deterrent system 100 of the present invention and its various components can be of any suitable size and configuration as is known in the art without affecting the overall concept of the invention, provided that they accomplish the above-stated objectives. One of ordinary skill in the art will appreciate that the size, configuration, and material of the intruder deterrent system 100 as shown in the FIGS. are for illustrative purposes only, and that many other sizes and shapes of the intruder deterrent system 100 are well within the scope of the present disclosure. Although the dimensions of the intruder deterrent system 100 are important design parameters for user convenience, the intruder deterrent system 100 may be of any size, shape and/or configuration that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An intruder deterrent system comprising:

a bullet-resistant ceramic walled enclosure comprising an aluminum frame, a plurality of solid ceramic walls supported by the aluminum frame surrounding an enclosure, and a biometric activated access panel within one of the solid ceramic walls for accessing the enclosure;

a plurality of interior electronics housed within the enclosure comprising a Wi-Fi router, a Cat 6 Port, a cradle point modem, an intrusion soundboard, a computer, and an antenna;

a battery;

a charging system;

a non-transparent fabric slipcover configured to encapsulate the bullet-resistant ceramic walled enclosure and comprising at least one concealing pattern indicia configured to disguise the bullet-resistant ceramic walled enclosure encapsulated within;

a speaker;

a light;

an infrared camera;

a sound detecting sensor in communication with and configured to activate the speaker upon detection of a sound in excess of 140 decibels; and a mount comprising an external motion sensor, a ground sensor, a mount light, a mount speaker, and an intrusion control board.

2. The intruder deterrent system of claim 1, wherein the mount is comprised of a stationary mount.

3. An intruder deterrent system comprising:

an enclosure comprised of an interior space, a frame, and a plurality of multi-layered walls each comprising a plurality of bullet-resistant armored steel and ceramic layers and a RFID or Bluetooth® activated access panel within one of the multi-layered walls for accessing the enclosure;

a battery;

a charging system;

a non-transparent fabric slipcover configured to encapsulate the enclosure and comprised of a concealing pattern indicia configured to disguise the enclosure encapsulated within;

a TCP-A10 long-distance hailing speaker positioned on one of the multi-layered walls configured to produce bore-sighted sound in a plurality of frequencies simultaneously;

an electronic component within the enclosure comprising a Wi-Fi router, a Cat 6 Port, a cradle point modem, an intrusion soundboard, a computer, and an antenna;

an audio amplifier within the enclosure;

a light within the enclosure;

a night vision camera;

a plurality of sensors comprising a radar sensor, an artificial intelligence sensor, a driven motion sensor, a sound sensor, and a vibration sensor; and a mount comprising an external motion sensor, a ground sensor, a mount light, a mount speaker, and an intrusion control board; and wherein each of the plurality of sensors are in communication with and configured to activate the speaker when triggered.

4. The intruder deterrent system of claim 3, wherein the mount is comprised of an articulating mount.

5. The intruder deterrent system of claim 3, wherein the frame is comprised of a welded frame.

6. The intruder deterrent system of claim 3, wherein the charging system is comprised of a trickle charging system.

7. A method of using an intruder deterrent system, the method comprising the steps of:

providing a deterrent device;

concealing the deterrent device with a non-transparent fabric cover comprising at least one concealing indicia;

monitoring an area using a camera, a radar sensor, an artificial intelligence sensor, a driven motion sensor, a sound sensor, and a vibration sensor of the deterrent device;

producing a sound via a speaker of the deterrent device and a pulsating light display via a light of the deterrent device in response to an alert notification produced by the plurality of sensors or the camera of the deterrent device; and communicating with a first responder using a photo or a video from the camera; and wherein the deterrent device comprises a welded frame and a plurality of solid ceramic walls supported by the welded frame surrounding an enclosure comprising a plurality of interior electronics comprising a Wi-Fi router, a Cat 6 Port, a cradle point modem, an intrusion soundboard, a computer, and an antenna.

8. The method of claim 7, wherein the sound is comprised of a verbal command or a frequency at 156 decibels.

* * * * *